United States Patent

Gratzmuller

[15] 3,641,357
[45] Feb. 8, 1972

[54] CIRCUIT-BREAKING TECHNIQUE AND DEVICE

[72] Inventor: Jean Louis Gratzmuller, 66 Boulevard Maurice Barres, 92 Neuilly sur Seine, France

[22] Filed: May 28, 1970

[21] Appl. No.: 41,351

[30] Foreign Application Priority Data

June 3, 1969  France ............................... 69 18 170
Apr. 15, 1970  France ............................... 70 13 557

[52] U.S. Cl. ............................................ 307/94, 317/11
[51] Int. Cl. ............................................................. H02h
[58] Field of Search ............... 307/93, 136, 92, 94, 85, 86;
  317/11 A, 11 E, 11 C, 88, 26, 16; 200/144 AP

[56] References Cited

UNITED STATES PATENTS

| | | |
|---|---|---|
| 3,234,397 | 2/1966 | Park ............................................. 307/86 |
| 3,534,226 | 10/1970 | Lian ............................................. 317/11 |
| 3,172,980 | 3/1965 | Thommen ............................... 200/144 AP |
| 3,192,440 | 6/1965 | Baltensperger ........................... 317/11 |
| 3,538,278 | 11/1970 | Rathbun ............................... 307/136 X |

FOREIGN PATENTS OR APPLICATIONS 548,092  9/1942  Great Britain ........................... 317/11

*Primary Examiner*—D. F. Duggan
*Attorney*—Jacobi, Lilling & Siegel

[57] ABSTRACT

A method and apparatus for cutting off a branch between two junctions of a DC power transmission network in which there are first earthed by closing contactors two adjacent points of said branch, a circuit breaker located between said points is opened, other circuit breakers are successively opened, each such circuit breaker being mounted in series with a resistor, and a capacitor absorbs the final cutoff current.

15 Claims, 4 Drawing Figures

PATENTED FEB 8 1972 3,641,357
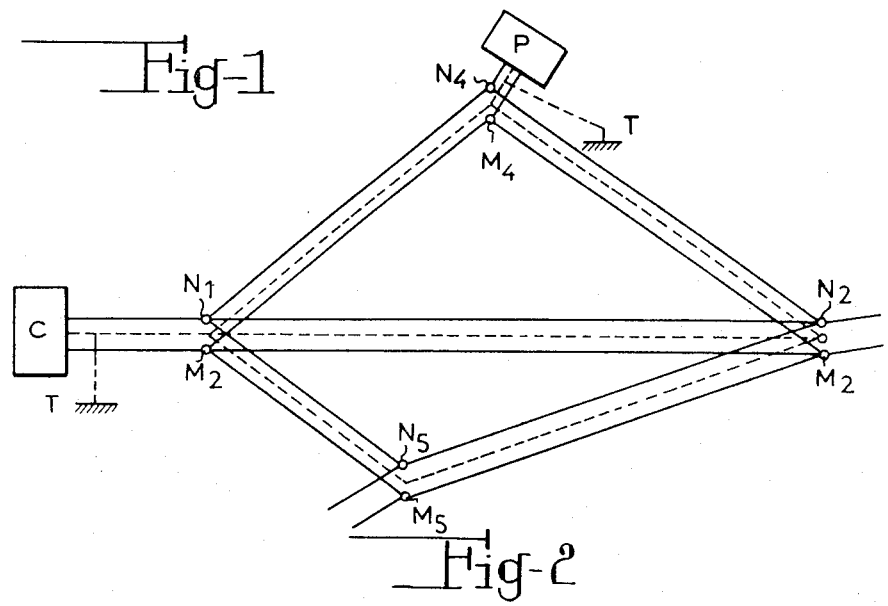
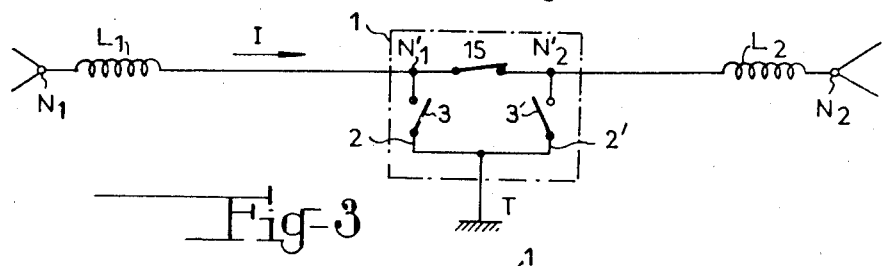
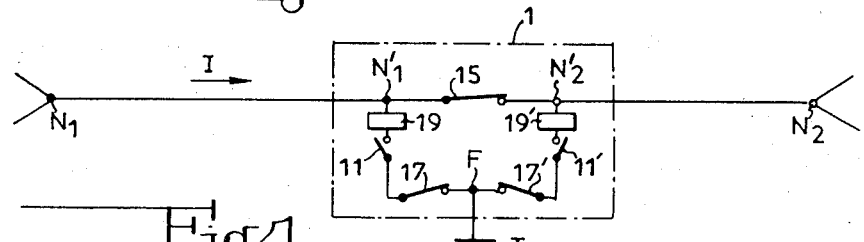
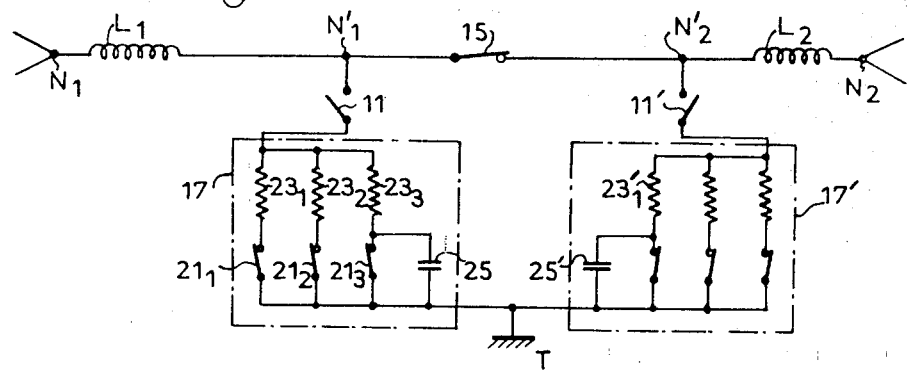
Jean Louis Gratzmuller
INVENTOR
Jacobi, Davidson, Lilling & Siegel
HIS ATTORNEYS

CIRCUIT-BREAKING TECHNIQUE AND DEVICE

The present invention relates to a method and apparatus for interrupting a DC power transmission line.

It is a recognized fact that the transport of electrical power, especially over long distances, is more economical at high-tension DC current than in the form of alternating current. It is also recognized that the steadily increasing power and voltages of AC transmission networks poses serious problems, especially as a result of the interconnection of networks in the same territory, and sometimes in several neighboring countries.

DC transmission would allow many of such problems to be solved: transmission would be possible by underground cable, difficulties of instability and synchronization would be eliminated, lower losses, and there would no longer be a theoretical limit to the power transmitted by a line at a given voltage, etc.

Despite recent advances in the transformation of alternating into direct current and vice versa, it has not yet been possible to exploit these advantages because of the the problems involved in interrupting direct current flow in high-tension lines.

Thus, in DC lines developed in recent years, e.g., the France-England link, no means of current interruption have been provided in the DC part, but only on the AC part, before or after transformation. In addition, DC plants constructed until now concern only power-transport connections, and not grid networks for which, of course, the problems are even more complex by virtue of the influence on one another of the various branches of the network.

On the other hand, in a DC power-transport network, the coordination of the insulators is even more important than in AC networks, for the insulators are not subject to fatigue due to the alternating voltages, and can be designed without taking this particular factor into account. As a result, in a DC network, the need to limit surges, notably shunt surges, is an essential which makes it difficult to find a practical and economical solution to the problem of cutting off in such networks.

In an AC network, the short circuit current is relatively high and is established almost instantaneously, reaching a stable value depending on the interconnected power.

Cutoff is relatively easy, despite the high value of the current reached, because of the periodic passage of the current through zero.

In contrast, in the case of a short circuit in a DC network, the rate at which the current increases is relatively low (thanks to the possibility of incorporating inductors in the line, which have no effect on the quiescent value) but, in the case of delayed cutoff, the short circuit current would soon reach an extremely high value which would be impossible to interrupt.

The result is that DC circuit breakers for interrupting a predetermined maximum current must be provided either with an independent automatic release acting at a prescribed threshold current, or with a limiter for preventing release beyond the said threshold.

This latter solution cannot be utilized, as a short circuit would incur the risk of a general breakdown over the whole network.

With the former solution the possibility must be envisaged of several circuit breaks in series along a part of the line without the addition of the voltages thus obtained causing, in the network, a greater surge than that which would be caused by one single circuit break (with respect to the coordination of the insulators).

The present invention aims at providing a method and apparatus which permits cutoff difficulties to be overcome or alleviated, even in a meshed (grid) network.

A grid network comprises a certain number of branches, each branch being disposed between two terminal branches from which other branches split off.

The problem of cutoff on a network may thus be reduced to the cutoff of current on an elementary branch between two junctions.

In contemporary practice with AC current at least one circuit breaker is incorporated in each branch (and, in general, a circuit breaker at each end of the branch), the surges on opening appearing between the two input terminals of the circuit breaker.

In a DC network branch, such a practice may lead to excessive surges which no longer respect the coordination of the insulators, by virtue of the unforeseeable influence of the inductive or capacitative conditions of the rest of the network, i.e., above and below the line relative to the cutoff.

Circuit breakers have been proposed in which it is possible to check and limit the value reached by the surges. Such a result is obtained, e.g., by varying the blowout of the dielectric fluid during the cutoff, or by progressively eliminating resistances mounted beforehand in parallel on the input terminals of the circuit breaker. This control of the surges may be automatic, e.g., as a function of the values of certain quantities, such as current or voltage, or as a function of time, or again by means of static devices, e.g., of the nonlinear resistance type. Circuit breakers thus equipped can thus be termed controllable- or controlled-surge circuit breakers, but in the following they will simply be termed "limited-surge cutoff devices".

However, the surges appearing between the two points under consideration of the network branch to be cut off, i.e., between the two input terminals of the cutoff device, are floating voltages which are not related to a datum potential, and which may reach values dangerous for the rest of the installation, especially in the case of simultaneous cutoffs on several points of a branch, unless the insulators are made larger, which would be very expensive.

In accordance with an aspect of the invention the surges of each input terminal of the cutoff system are controlled with reference to a datum potential, so that the influence of the part above the cutoff system and the part below it are dissociated.

In accordance with a further aspect, the invention provides a method of making a cutoff on a branch connecting two junctions $N_1$, $N_2$ of a high-tension DC network comprising the steps of linking to earth two adjacent points $N'_1$, $N'_2$ of the branch; making an open circuit in the section $N'_1$–$N'_2$ of said branch; then separately making open circuits on each of the sections comprised respectively between $N'_1$ and earth and $N'_2$ and earth; and limiting the cutoff surge.

In accordance with yet a further aspect the invention further provides an arrangement for open circuiting a branch between two junctions of a DC transmission line comprising: a cutoff device interposed between two different points $N'_1$ and $N'_2$ with different points $N'_1$ and $N'_2$ of the branch; two identical circuits connecting points $N'_1$ and $N'_2$ with earth, each of the said circuits comprising a connecting apparatus, such as a contactor, in series with a limited cutoff surge interruptor device.

According to a preferred embodiment the above limited cutoff surge interruptor device is a multiple circuit breaker with resistances, said resistances being preferably of the nonlinear resistor type.

Embodiments of the invention will now be further described by way of example only with reference to the accompanying drawing, wherein:

FIG. 1 is a schematic diagram of a DC transmission network;

FIG. 2 is a schematic diagram of one of the branches of the network equipped with a breaker system according to the invention; and FIGS. 3 and 4 illustrate two further breaker embodiments.

The bipolar DC transmission network shown schematically in FIG. 1 comprises, for the one polarity, several branches, and, for the other polarity, several branches, each branch being disposed between two nodes from which other branches are taken towards generator stations, such as C, and towards consumer or conversion points, such as P. A conductor T at earth potential defines the datum or neutral potential, the generators or consumer points (rectifiers or converters) all being earthed to this neutral.

As the problems of cutting off on a network can be reduced to cutting off on a branch, which is even more true if a unipolar network is involved, there will be considered in the following only one single-wire line comprised between two junctions $N_1$, $N_2$ (FIG. 2) between which flows a current $I_1$ and which has an up-current inductor $L_1$ and a down-current inductor $L_2$. These two inductors, the inductance of which will always lie between a maximum and a minimum value, depend on the characteristics of the other branches, upstream and downstream, connected to the junctions $N_1$, $N_2$, characteristics which may vary according to the type of couplings on the overall network.

According to the theoretical embodiment shown in FIG. 2, the cutoff system 1 according to the invention interposed on branch $N_1$ $N_2$, comprises two circuits 2–2 connecting two nodes $N'_1$ $N'_2$ of the branch with earth, allowing the creation of two half-branches $N_1N'_1T$ and $N_2N'_2T$, and comprises separation means 15 interposed between the two intermediate points $N'_1N'_2$ of the branch. Each of the connecting circuits 2–2' comprises at least one limited-surge cutoff device shown diagrammatically at 3–3', As the branch is in the condition for passing the current as shown in FIG. 2, the following procedure is adopted when a cutoff is to be effected: the connecting circuits 2–2' are established, e.g., by closing the devices 3–3', the separation unit 15 is then opened, then, substantially simultaneously, both limited-surge cutoff devices 3–3' are opened.

The two half-branches $N_1N'_1$ and $N_2N'_2$ are thus separated from one another and insulated from earth, the surges being limited, during the cutoff operation, to the intrinsic surges of the devices 3–3', avoiding all influence originating respectively upstream or downstream from the cutoff system 1.

In practice, it would be inconvenient, in order to effect a cutoff, to have to close and then immediately reopen the devices 3—3' as described with reference to FIG. 2. This is why it is preferable to use the embodiment shown in FIG. 3.

In this embodiment, the means of connecting the branch $N_1N_2$ with earth comprises two connecting devices 11–11', such as contactors, interposed between the earth T and the two points $N'_1$ and $N'_2$ of the branch. These connecting means, at the moment of cutoff, allow the creation of two half-branches $N_1$–$N'_1T$ and $N_2$–$N'_2T$. The separation means for the two half-branches thus created comprise a cutoff device 15 interposed between the points $N'_1$ and $N'_2$. Finally, the means of interrupting the connections of the branch with the earth may be constituted by limited-surge cutoff devices such as circuit-breakers 17–17'.

Starting with the condition shown in FIG. 3, the following procedure is adopted in order to effect a cutoff on the branch: both contactors 11–11' are closed in order to connect with earth the points $N'_1$, $N'_2$; the cutoff device 15 is opened, to separate the two half-branches; then the two circuit breakers 17, 17' are opened. Control means 19, 19' may act on certain characteristics of the circuit breakers (e.g., opening the contacts, intensity of the blowout, insertion of resistances, etc.) in order to keep the operational surges at a value comprised between the normal network voltage and the permissible surge for the coordination of the insulators. These control means may be chronometric means, or means sensitive to an electrical magnitude such as the voltage in relation to earth of the points $N'_1$, $N'_2$, or the strength passing through the circuit breaker.

In practice, there would be arranged on each branch a cutoff system according to the invention at each end of the branch, i.e., in the vicinity of each junction.

The preferred embodiment of the invention is shown in FIG. 4, which is analogous to FIG. 3, except that a particular type of limited-surge cutoff devices 17, 17' is incorporated. As these devices are identical, only one of them will be described.

The device 17 is composed of a plurality (e.g., 13) of circuit breakers, $21_1, 21_2, 21_3 \ldots$ with intercalary resistances $23_1, 23_2, 23_3 \ldots$ said resistances being preferably of the variable-resistance type.

A method is already known of incorporating resistances in AC circuit-breakers, with a view to limiting the surges caused by the inductive currents. A method is also known of using for this purpose variable resistances of the type used in lightning conductors. It is known that these variable resistances, or nonlinear resistances, are of the semiconducting heterogeneous electronic type, whose value decreases very rapidly when the voltage applied to them increases.

The current/voltage characteristic of such resistors is generally of the form $I = I \cdot U^K$, in which $I$ is a parameter of the nonlinear resistance chosen, and $K$ the exponent of the voltage variation. The coefficient $K$ is of the order of 2 to 7, depending on the materials used and the current densities, the current coefficients being from 2 to 4.

It will be seen in the following that, because of the adoption as a cutoff device of a multiple circuit breaker with nonlinear intercalary resistors, the final cutoff (that of circuit breaker $21_3$ in FIG. 4), is made at a very reduced strength which may be easily absorbed in a low-capacity capacitor 25, mounted in parallel on the terminals of the last circuit breaker, this result being obtained at a relatively reduced number, e.g., 3, of cutoff stages.

Preferably, in the cutoff system shown in FIG. 4, the cutoff device is a spring-opening circuit breaker with controlled closure e.g., by oil pressure); the connectors 11, 11' are spring-closed, controlled-opening contactors; the circuit breakers $21_1, 21_2, 21_3, \ldots$ and $21'_1, 21'_2, 21'_3$, are spring operated and have controlled closure.

The term "spring" is used here to indicate any readily available elastic means, among other things pneumatic springs. Such an arrangement makes cutoff always possible.

Parallel-mounted multiple circuit breakers with intercalary resistances have been shown, but circuit breakers and resistances mounted in series may also be used.

Parallel mounting of the circuit breakers has the advantage that all the circuit breakers have an earth terminal, which simplifies the insulators.

The procedure for effecting a cutoff on branch $N_1N_2$, with the system in FIG. 4, is the following, starting with the position for passing current shown in the FIGURE: contactors 11, 11' are closed and, substantially simultaneously, circuit breaker 15 is opened. Then circuit breakers $21_1, 21_2, 21_3$, are successively opened, the opening sequence being controlled chronometrically or by devices sensitive to voltages or strengths. Naturally, an identical operation is carried out on the other symmetrically disposed device 17'.

If, as shown in FIG. 4, a three-stage cutoff is chosen, i.e., three circuit breakers 21 associated with three nonlinear resistances 23, resistances $23_1, 23_2, 23_3$ are chosen which have increasing values (naturally measured under equivalent voltages) the increase being for example staged in the order 1—10+100. Thus, after closure of the contactor 11 and before opening circuit breakers $21_1, 21_2, 21_3$, the strengths which pass respectively into resistors $23_1, 23_2, 23_3$ are about 90/100 $I$ –9/100 $I$, $I$ being the total current.

If, under the circumstances, it is supposed that nonlinear resistors have been chosen whose coefficient K is such that a variation in voltage of ratio 2 gives a strength variation of ratio 10, and that a surge coefficient equal to 2 is admitted, the strength on each of the opening sequences is divided by 10. As there are three sequences, the maximum strength is divided by 1,000 on the last cutoff, and this current may easily be absorbed in a capacitor 25 of low capacitance, a supplementary resistor being mounted if required in series with the capacitor to suppress oscillations.

I claim:

1. A method of effecting a cutoff on a branch connecting two junctions $N_1N_2$ of a high-tension DC network comprising the steps of: connecting to earth two neighboring portions $N'_1$, $N'_2$ of the branch; effecting cutoff on section $N'_1$–$N'_2$ of the branch; then effecting cutoff separately on each of the sections respectively comprised between point $N'_1$ and earth and between point $N'_2$ and earth; and limiting the cutoff surge relative to earth.

2. A circuit breaker for cutting off a branch between two junctions of a DC transmission network, said system comprising: a cutoff device interposed between two neighboring points $N'_1$ and $N'_2$ of the branch; two identical circuits connecting points $N'_1$ and $N'_2$ with earth, each of the said circuits comprising a connector device such as a contactor, in series with a limited-surge cutoff device.

3. A circuit breaker as claimed in claim 2 in which the cutoff device disposed up-current with limited cutoff surge is a multiple circuit breaker with resistors.

4. A circuit breaker as claimed in claim 3 in which the surge-limiting resistors associated with the multiple circuit breaker are nonlinear resistors.

5. A circuit breaker as claimed in claim 3 in which the said multiple circuit breaker comprises a plurality of elementary circuit breakers each associated with a resistor.

6. A circuit breaker as claimed in claim 5 in which each elementary circuit breaker is mounted in series with a resistor, the circuit breaker/resistor assemblies being mounted in parallel.

7. A circuit breaker as claimed in claim 6 in which each of the elementary circuit breakers has a terminal connected to earth.

8. A circuit breaker as claimed in claim 5, comprising means for controlling the opening, in turn, of the said elementary circuit breakers.

9. A circuit breaker as claimed in claim 8 in which the said control means comprises a chronometric unit controlling the openings in accordance with a determined time-sequence.

10. A circuit breaker as claimed in claim 5, in which a capacitor is mounted in parallel on the terminals of the last elementary circuit breaker.

11. A circuit breaker as claimed in claim 5 in which the cutoff device interposed between the two neighboring points $N'_1 N'_2$ of the branch is a circuit breaker opening by elastic means; in which the said connectors are connectors closing by elastic means; and in which the said elementary circuit breakers open by elastic means; said elastic means being always available, whereby the cutoff operation is always possible.

12. A circuit breaker for cutting off a branch between two junctions of a DC transmission network, said system comprising a circuit breaker with elastic opening means interposed between two neighboring points $N'_1$ and $N'_2$ of the branch, two similar circuits connecting the points $N'_1$ and $N'_2$ with the earth, each of the said circuits comprising a contactor closing by elastic means, in series with a multiple circuit breaker with resistors, comprising a plurality of elementary circuit breakers opening by elastic means, said elementary circuit breakers being mounted in parallel, each being associated in series with a resistor, and each having a terminal to earth, a capacitor mounted in parallel on the terminals of the last of the said elementary circuit breakers, and chronometric control means alternately controlling the opening of the said elementary circuit breakers in accordance with a predetermined time sequence.

13. A circuit breaker comprising separable contact means arranged to bridge two terminals of a DC transmission line; a first voltage surge suppressor line having one end connected to one of said terminals and its other end connected to earth; and a second voltage surge suppressor line having one end connected to earth and its other end connected to the other terminal, each of said first and second voltage surge suppressor lines including a normally open switch, and means effective upon closing of said switch to limit surge over voltages produced upon separation of said contact means.

14. A circuit breaker according to claim 13, in which each of said two voltage surge suppressor lines includes a normally closed second switch connected in series with said normally open switch of the corresponding line, said second switch being opened upon separation of said contact means.

15. A circuit breaker according to claim 13, in which said voltage surges limiting means are constituted by a sequential switching system including a plurality of resistors connected in parallel to each other, normally closed switches connected in series with said resistors, respectively, and a capacitor connected in parallel across one of said parallel connected switches.

* * * * *